United States Patent
Zhou et al.

(10) Patent No.: US 10,417,750 B2
(45) Date of Patent: Sep. 17, 2019

(54) IMAGE PROCESSING METHOD, DEVICE AND PHOTOGRAPHIC APPARATUS

(71) Applicant: SZ DJI TECHNOLOGY CO., LTD., Shenzhen (CN)

(72) Inventors: Guyue Zhou, Shenzhen (CN); Ketan Tang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 85 days.

(21) Appl. No.: 15/617,488

(22) Filed: Jun. 8, 2017

(65) Prior Publication Data
US 2017/0270647 A1 Sep. 21, 2017

Related U.S. Application Data

(63) Continuation of application No. PCT/CN2014/093389, filed on Dec. 9, 2014.

(51) Int. Cl.
   - *G06T 5/00* (2006.01)
   - *G06T 3/40* (2006.01)
   - *G06T 7/13* (2017.01)

(52) U.S. Cl.
   CPC .............. *G06T 5/005* (2013.01); *G06T 5/006* (2013.01); *G06T 7/13* (2017.01); *G06T 3/4007* (2013.01); *G06T 2207/10016* (2013.01)

(58) Field of Classification Search
None
See application file for complete search history.

(56) References Cited

U.S. PATENT DOCUMENTS

| 6,076,004 A * | 6/2000 | Kanayama | A61B 5/055 128/920 |
| 6,437,823 B1 * | 8/2002 | Zhang | H04N 17/002 348/187 |

(Continued)

FOREIGN PATENT DOCUMENTS

| CN | 1996389 A | 7/2007 |
| CN | 101271573 A | 9/2008 |

(Continued)

OTHER PUBLICATIONS

Devernay, Frederic, and Olivier Faugeras. "Straight lines have to be straight." Machine vision and applications 13, No. 1 (2001): 14-24. (Year: 2001).*

(Continued)

*Primary Examiner* — Michelle M Entezari
(74) *Attorney, Agent, or Firm* — Anova Law Group, PLLC

(57) ABSTRACT

An image processing method includes correcting a target image based on an initial distortion coefficient to obtain a first corrected target image, performing straight-line fitting on a first border line in the first corrected target image to calculate a first distortion metric value and a correction distortion coefficient, correcting the target image based on the correction distortion coefficient to obtain a second corrected target image, performing straight-line fitting on a second border line in the second corrected target image to calculate a second distortion metric value, detecting whether a preset correction condition is satisfied based on at least one of the first distortion metric value or the second distortion metric value, and configuring the correction distortion coefficient as the initial distortion coefficient if the preset correction condition is not satisfied.

16 Claims, 6 Drawing Sheets

(56) References Cited

U.S. PATENT DOCUMENTS

| | | | |
|---|---|---|---|
| 6,618,494 B1* | 9/2003 | Nonay | G06T 3/0081 378/207 |
| 8,155,477 B2* | 4/2012 | Utsugi | G06T 3/0062 382/275 |
| 9,454,263 B2* | 9/2016 | Ilmonen | G06F 3/0304 |
| 10,178,314 B2* | 1/2019 | Morimoto | H04N 5/23267 |
| 2002/0000998 A1* | 1/2002 | Scott | G06F 17/30274 345/667 |
| 2002/0118889 A1* | 8/2002 | Shimizu | G06T 5/008 382/274 |
| 2003/0035100 A1* | 2/2003 | Dimsdale | H04N 17/002 356/124 |
| 2006/0023942 A1* | 2/2006 | Guleryuz | H04N 1/603 382/167 |
| 2006/0050074 A1* | 3/2006 | Bassi | G06T 3/0006 345/427 |
| 2006/0093239 A1 | 5/2006 | Kakinami | |
| 2007/0098296 A1* | 5/2007 | Souchard | G06T 3/0018 382/275 |
| 2007/0242233 A1* | 10/2007 | Sokeila | G03B 21/26 353/69 |
| 2008/0292131 A1* | 11/2008 | Takemoto | H04N 13/246 382/100 |
| 2010/0061601 A1* | 3/2010 | Abramoff | G06K 9/00617 382/117 |
| 2010/0110189 A1* | 5/2010 | Kuboyama | B60R 1/00 348/148 |
| 2011/0128377 A1* | 6/2011 | Katz | H04N 5/217 348/143 |
| 2012/0050488 A1* | 3/2012 | Cohen | G06T 5/006 348/46 |
| 2012/0180084 A1* | 7/2012 | Huang | G06T 19/006 725/32 |
| 2012/0320190 A1* | 12/2012 | Natroshvili | G06T 5/006 348/135 |
| 2012/0327214 A1* | 12/2012 | McEntyre | G01N 21/93 348/86 |
| 2013/0141525 A1* | 6/2013 | Williams | H04N 7/00 348/38 |
| 2013/0259403 A1* | 10/2013 | Osinusi | G06K 9/3208 382/294 |
| 2015/0092982 A1* | 4/2015 | Kang | G06K 9/3241 382/103 |
| 2015/0146048 A1* | 5/2015 | Du | G06T 5/006 348/241 |

FOREIGN PATENT DOCUMENTS

| | | | |
|---|---|---|---|
| CN | 101789122 A | | 7/2010 |
| CN | 102169573 A | | 8/2011 |
| CN | 102750697 A | * 10/2012 | G06T 5/006 |

OTHER PUBLICATIONS

Brauer-Burchardt, C. and Voss, K., 2001. A new algorithm to correct fish-eye-and strong wide-angle-lens-distortion from single images. In Image Processing, 2001. Proceedings. 2001 International Conference on (vol. 1, pp. 225-228). IEEE. (Year: 2001).*

Kannala, Juho, and Sami S. Brandt. "A generic camera model and calibration method for conventional, wide-angle, and fish-eye lenses." IEEE transactions on pattern analysis and machine intelligence 28.8 (2006): 1335-1340. (Year: 2006).*

Prescott, B. and McLean, G.F., 1997. Line-based correction of radial lens distortion. Graphical Models and Image Processing, 59(1), pp. 39-47. (Year: 1997).*

Machine translation of CN 102750697 A (Year: 2012).*

Machine Translation of CN 101789122 B (Year: 2013).*

Machine Translation of CN 101271573 A (Year: 2008).*

The World Intellectual Property Organization (WIPO) International Search Report for PCT/CN2014/093389 dated Aug. 28, 2015 5 Pages.

Bo Tu et al., A Calibration Method for Fish-eye Cameras Based on Pinhole Model, ACTA Automatica Sinica, Apr. 2014, pp. 653-659, vol. 40, No. 4, China.

* cited by examiner

IMAGE PROCESSING METHOD, DEVICE AND PHOTOGRAPHIC APPARATUS

CROSS-REFERENCE TO RELATED APPLICATION

This is a continuation application of International Application No. PCT/CN2014/093389, filed on Dec. 9, 2014, the entire contents of which are incorporated herein by reference.

FIELD OF THE DISCLOSURE

The present disclosure relates to the technical field of image processing, and in particular, to an image processing method, device, and photographic apparatus.

BACKGROUND

As wide-angle lenses have been more and more widely used, especially with their use on aerial shooting apparatuses, camera distortion caused by the wide-angle lenses has attracted more and more attention. If correction is not made, images or videos taken by the wide-angle lenses may have a serious barrel distortion. For example, when a sport court is shot, straight lines sprayed on the court may be distorted and appear as curved lines. Therefore, a camera may need to be calibrated to obtain a distortion coefficient thereof to correct the images or videos taken by the camera.

Camera distortion generally includes radial distortion and tangential distortion. For a wide-angle lens, a fourth-order polynomial radial distortion model has been proved to be sufficient. Distortion equations of a wide-angle lens are:

$$x^d = x^u(1 + k_1 r^2 + k_2 r^4), \quad (1)$$

$$y^d = y^u(1 + k_1 r^2 + k_2 r^4), \quad (2)$$

where $(x^u, y^u)$ denote coordinates before distortion, also referred to as "non-distorted coordinates," and $(x^u, y^u)$ denote corresponding coordinates after distortion, also referred to as "distorted coordinates." A distortion center can be represented by its coordinates $(c_x, c_y)$, and the parameter $r$ in Equations (1) and (2) can be calculated using $r = \sqrt{(x^u - c_x)^2 + (y^u - c_y)^2}$. The purpose of the calibration is to determine distortion coefficients $k = (k_1, k_2)$ and the distortion center $c = (c_x, c_y)$.

Usually, the distortion center $(c_x, c_y)$ in an image is close to a central point $$\left(\frac{w}{2}, \frac{h}{2}\right)$$

of the image, where w and h are the width and the height of the image, respectively. The central point of the image can be used as an initial value of the distortion center, and an optimal solution to the distortion center can be obtained by a small number of times of iteration. However, it may be relatively more difficult to calculate the distortion coefficients.

In conventional technologies, a lens can be calibrated using a calibration board. In particular, a series of images or videos of the calibration board can be taken, and then internal references and distortion coefficients can be calculated according to geometric constraints. After the distortion coefficients are obtained, the shot videos or images can be corrected. Calibration using the calibration board can be relatively accurate as long as a high-accuracy calibration board is used. This is a barrier to ordinary users when performing calibration.

SUMMARY OF THE DISCLOSURE

Embodiments of the present disclosure provide an image processing method, device, and video camera, which can easily and rapidly determine a distortion coefficient to process an image.

In accordance with the disclosure, there is provided an image processing method including correcting a target image based on an initial distortion coefficient to obtain a first corrected target image, performing straight-line fitting on a first border line in the first corrected target image to calculate a first distortion metric value and a correction distortion coefficient, correcting the target image based on the correction distortion coefficient to obtain a second corrected target image, performing straight-line fitting on a second border line in the second corrected target image to calculate a second distortion metric value, detecting whether a preset correction condition is satisfied based on at least one of the first distortion metric value or the second distortion metric value, and configuring the correction distortion coefficient as the initial distortion coefficient if the preset correction condition is not satisfied.

In some embodiments, the method further includes, before correcting the target image, capturing an image of an object including straight line features and adjusting a size of the captured image to obtain the target image.

In some embodiments, adjusting the size of the captured image includes magnifying, if the size of the captured image is smaller than a preset size threshold, the captured image to a target size through interpolation, or scaling down, if the size of the captured image is greater than the preset size threshold, the captured image to the target size through down-sampling.

In some embodiments, performing straight-line fitting on the first border line to calculate the first distortion metric value and the correction distortion coefficient includes performing edge detection on the first corrected target image to determine the first border line in the first corrected target image, performing straight-line fitting on the first border line based on polynomial straight-line fitting to obtain a fitted straight line, and calculating the first distortion metric value of the first border line relative to the fitted straight line and the correction distortion coefficient corresponding to the first distortion metric value.

In some embodiments, calculating the first distortion metric value and the correction distortion coefficient includes determining a straight line segment in the first border line, calculating distances from corresponding points on the straight line segment to the fitted straight line, obtaining the first distortion metric value according to the distances, and performing non-linear optimization on the first distortion metric value to obtain the correction distortion coefficient.

In some embodiments, correcting the target image according to the initial distortion coefficient includes correcting a target border line in the target image based on the initial distortion coefficient, and correcting the target image based on the correction distortion coefficient includes correcting the target border line in the target image based on the correction distortion coefficient.

In some embodiments, performing straight-line fitting on the second border line to calculate the second distortion metric value includes performing edge detection on the second corrected target image to determine the second border line in the second corrected target image, performing straight-line fitting on the second border line based on polynomial straight-line fitting to obtain a fitted straight line, and calculating the second distortion metric value of the second border line relative to the fitted straight line.

In some embodiments, calculating the second distortion metric value includes, removing outliers, determining a straight line segment in the second border line, calculating distances from corresponding points on the straight line segment to the fitted straight line, and obtaining the second distortion metric value according to the distances.

In some embodiments, detecting whether the preset correction condition is satisfied includes calculating a relative variation amount between the first distortion metric value and the second distortion metric value, and determining whether the relative variation amount calculated is smaller than a preset variation threshold to determine whether the preset correction condition is satisfied.

In some embodiments, the method further including performing image correction based on the correction distortion coefficient if the preset correction condition is satisfied.

Also in accordance with the disclosure, there is provided a camera including a camera lens and an image processor. The image processor is configured to correct a target image based on an initial distortion coefficient to obtain a first corrected target image, perform straight-line fitting on a first border line in the first corrected target image to calculate a first distortion metric value and a correction distortion coefficient, correct the target image based on the correction distortion coefficient to obtain a second corrected target image, perform straight-line fitting on a second border line in the second corrected target image to calculate a second distortion metric value, detect whether a preset correction condition is satisfied based on at least one of the first distortion metric value or the second distortion metric value, and configure the correction distortion coefficient as the initial distortion coefficient if the preset correction condition is not satisfied.

In some embodiments, the image processor is further configured to capture an image of an object including straight line features through the camera lens, and adjust a size of the captured image to obtain the target image.

In some embodiments, the image processor is further configured to magnify, if the size of the captured image is smaller than a preset size threshold, the captured image to a target size through interpolation, or scale down, if the size of the captured image is greater than the preset size threshold, the captured image to the target size through down-sampling.

In some embodiments, the image processor is further configured to perform edge detection on the first corrected target image to determine the first border line in the first corrected target image, perform straight-line fitting on the first border line based on polynomial straight-line fitting to obtain a fitted straight line, and calculate the first distortion metric value of the first border line relative to the fitted straight line and the correction distortion coefficient corresponding to the first distortion metric value.

In some embodiments, the image processor is further configured to determine a straight line segment in the first border line, calculate distances from corresponding points on the straight line segment to the fitted straight line, obtain the first distortion metric value according to the distances, and perform non-linear optimization on the first distortion metric value to obtain the correction distortion coefficient.

In some embodiments, the image processor is further configured to correct the target image according to the initial distortion coefficient by correcting a target border line in the target image based on the initial distortion coefficient, and correct the target image based on the correction distortion coefficient by correcting the target border line in the target image based on the correction distortion coefficient.

In some embodiments, the image processor is further configured to perform edge detection on the second corrected target image to determine the second border line in the second corrected target image, perform straight-line fitting on the second border line based on polynomial straight-line fitting to obtain a fitted straight line, and calculate the second distortion metric value of the second border line relative to the fitted straight line.

In some embodiments, the image processor is further configured to remove outliers, determine a straight line segment in the second border line, calculate distances from corresponding points on the straight line segment to the fitted straight line, and obtain the second distortion metric value according to the distances.

In some embodiments, the image processor is further configured to calculate a relative variation amount between the first distortion metric value and the second distortion metric value, and determine whether the relative variation amount calculated is smaller than a preset variation threshold to determine whether the preset correction condition is satisfied.

In some embodiments, the image processor is further configured to perform image correction based on the correction distortion coefficient if the preset correction condition is satisfied According to the embodiments of the present disclosure, a distortion coefficient of an image can be determined comprehensively based on straight-line fitting and a distortion metric value. This optimizes a distortion coefficient calculation and can obtain a more accurate distortion coefficient automatically and intelligently. The methods and devices consistent with embodiments of the disclosure also do not require an additional calibration board, and have a low cost and are easy for users to use.

DETAILED DESCRIPTION OF THE EMBODIMENTS

The technical solution of the present disclosure will be described in more detail below with reference to the accompanying drawings. The described embodiments are merely some of the embodiments of the present disclosure rather than all of the embodiments. All other embodiments obtained by a person of ordinary skill in the art based on the embodiments of the present disclosure without creative efforts shall fall within the scope of the present disclosure.

Figure 1:
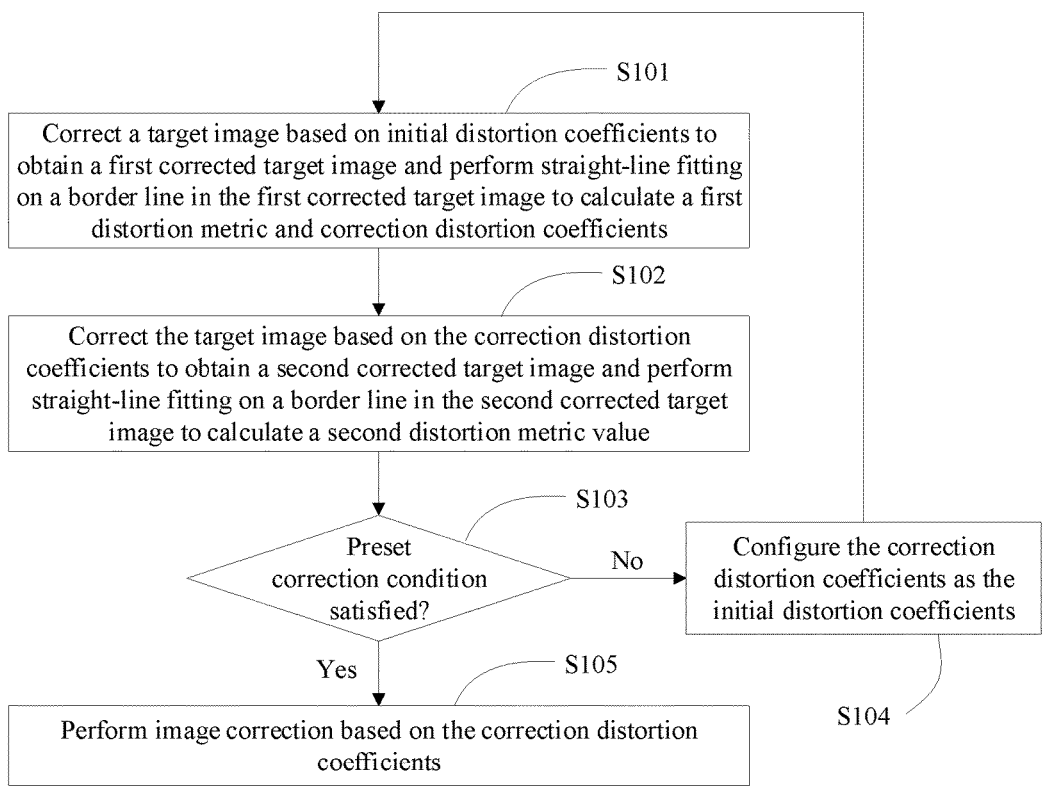
FIG. 1 is a schematic flow chart of one image processing method according to an embodiment of the present disclosure.

FIG. 1 is a schematic flow chart of an image processing method according to an embodiment of the present disclosure. The image processing method according to the embodiment of the present disclosure may be performed by an image processor. As shown in FIG. 1, at S101, a target image is corrected based on initial distortion coefficients to obtain a first corrected target image, and straight-line fitting is performed on a border line in the first corrected target image to calculate a first distortion metric value and correction distortion coefficients.

The initial distortion coefficients may be pre-configured. In some embodiments, the initial distortion coefficients can be configured according to a model of a camera lens.

The border line may be determined from the target image through edge detection. In the target image, the border line may be a straight-line edge of a building, and distortion of the target image can be corrected based on the border line that should be a straight line.

The edge detection may be based on positions of pixel points and amplitude variations of pixel values of the pixel points. In some embodiments, the edge detection can include a detection method having a sub-pixel accuracy.

Simple polynomial straight-line fitting may be employed for the straight-line fitting of the border line. A series of discrete pixel points that are supposed to be on a straight line, e.g., the border line, may scatter around a straight line in the image due to distortion. These discrete pixel points can be fitted into a straight line. The fitted straight line is used to reflect a basic trend of these discrete pixel points.

The first distortion metric value $E_{01}$ can be obtained according to distances from the discrete pixel points to the fitted straight line. For example, $E_{01}$ may be the sum of squares of the distances from the discrete pixel points to the fitted straight line. The smaller $E_{01}$ is, the smaller the distortion of the target image is, or vice versa. After $E_{01}$ is obtained, by performing a non-linear optimization on a function corresponding to $E_{01}$, a set of distortion coefficients that minimizes $E_{01}$ can be determined. The determined distortion coefficients are thus the correction distortion coefficients. In the following embodiments, one exemplary expression of the function corresponding to a distortion metric value will be further described in detail.

At S102, the target image is corrected based on the correction distortion coefficients to obtain a second corrected target image, and straight-line fitting is performed on a border line in the second corrected target image to calculate a second distortion metric value, $E_{02}$.

In order to save computing time and computing resources, the correction of the target image in S102 may include only the correction of the border line in the target image. When straight-line fitting is carried out, outliers can be removed to calculate the second distortion metric value more quickly.

The second distortion metric may be calculated in a manner similar to that described above for the first distortion metric.

At S103, whether a preset correction condition is satisfied is detected.

Whether the first distortion metric value and the second distortion metric value satisfy the preset correction condition can be determined by judging whether a relative variation amount between the first distortion metric value and the second distortion metric value is smaller than a preset variation threshold. In some embodiments, an equation for calculating the relative variation amount may be: $(E_{01}-E_{02})/E_{02}$. If a calculated result is smaller than the preset variation threshold, the correction condition is satisfied. On the other hand, if the calculated result is not smaller than the preset variation threshold, the correction condition is not satisfied.

In some embodiments, whether the preset condition is satisfied can be determined by judging whether the second distortion metric value is smaller than a preset metric threshold. If the second distortion metric value is smaller than the preset metric threshold, it is determined that the preset correction condition is satisfied.

At S104, if the preset correction condition is not satisfied, the correction distortion coefficients are configured as the initial distortion coefficients, and the process returns to S101.

The above-described processes in S101-S103 can be repeated until the preset correction condition is satisfied.

That is, if the preset correction condition is not satisfied, e.g., if the relative variation amount is not smaller than the preset threshold or if the second distortion metric value is not smaller than the preset metric threshold, then the correction to the target image is not sufficient enough to correct the distortion, and the distortion of the target image is still relatively large. Therefore, the target image is further corrected according to the correction distortion coefficients, and a new distortion metric value is calculated to determine whether the corrected target image meets the requirement.

At S105, if the preset correction condition is satisfied, image correction is performed based on the correction distortion coefficients.

That is, if the preset correction condition is satisfied, e.g., if the relative variation amount is smaller than the preset variation threshold or if the second distortion metric value is smaller than the preset metric threshold, then the correction to the target image with the correction distortion coefficients has met the requirement for distortion correction. The correction distortion coefficients are outputted for performing subsequent correction on other target images or other related processing.

The method according to the embodiment of the present disclosure can be performed when a video camera is being initialized, and the obtained correction distortion coefficients can be stored in a memory in order to perform subsequent processing based on the obtained correction distortion coefficients. In some embodiments, the method according to the present disclosure can be performed every time when shooting is performed to obtain correction distortion coefficients.

According to the embodiment of the present disclosure, distortion coefficients of an image can be determined based on straight-line fitting and a distortion metric value. This optimizes the calculation of the distortion coefficients and can obtain more accurate distortion coefficients automatically and intelligently. Further, additional calibration board is not required, which reduces cost and is easy for users to use.

Figure 2:
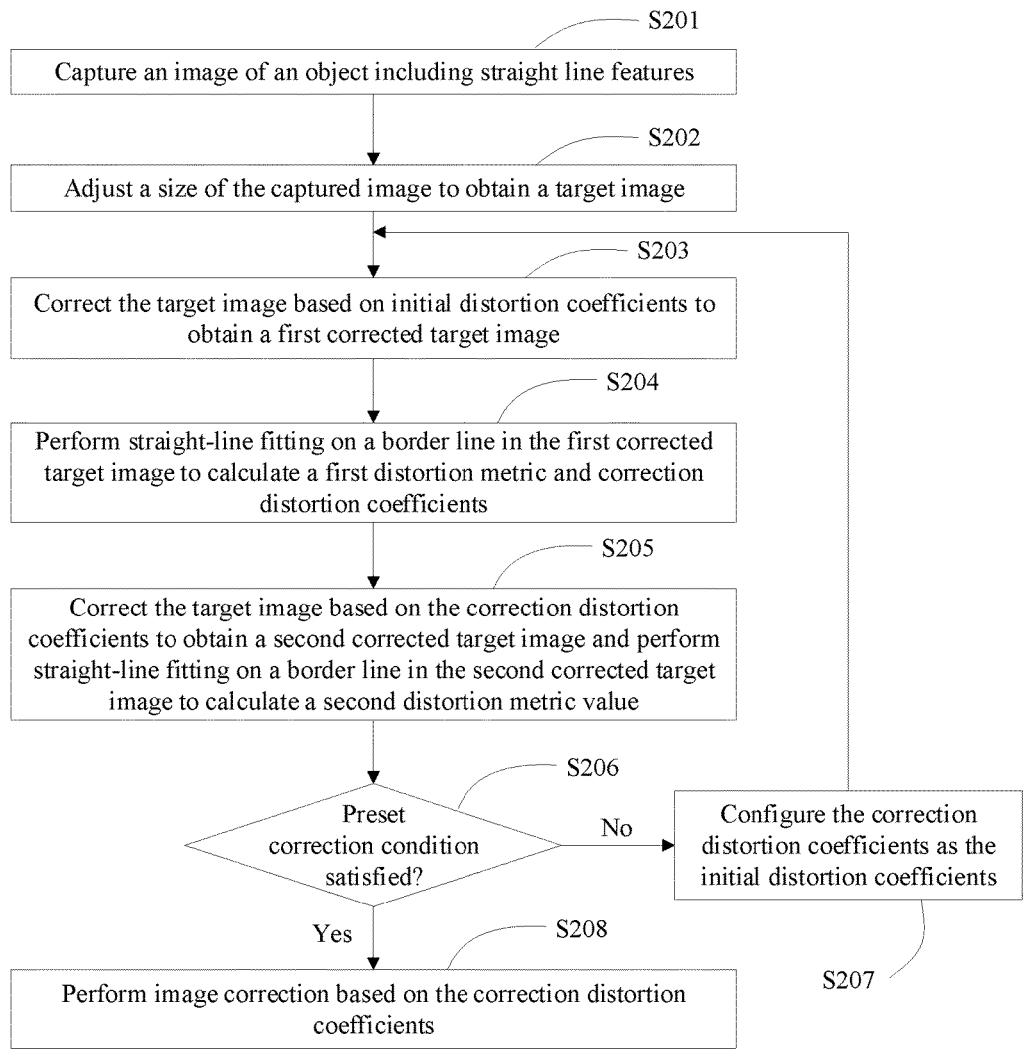
FIG. 2 is a schematic flow chart of another image processing method according to an embodiment of the present disclosure.

FIG. 2 is a schematic flow chart of another image processing method according to an embodiment of the present disclosure. The image processing method according to the embodiment of the present disclosure may be performed by an image processor. As shown in FIG. 2, at S201, an image of an object that includes straight line features is captured.

In some embodiments, multiple pictures can be captured and analyzed, among which one or more images including an object with straight line features, such as a building, a playground, or a motorway, can be used as target images for subsequent distortion analysis. In some embodiments, the multiple images can be processed simultaneously or separately, and each image is processed in the same manner.

At S202, a size of the captured image is adjusted to obtain a target image.

In some embodiments, if the size of the captured image is smaller than a preset size threshold, the captured image can be magnified to a target size through interpolation. If the size of the captured image is greater than the preset size threshold, the captured image can be scaled down to the target size through down-sampling.

Because the distortion coefficients are irrelevant to the size of the image, the size of the target image can be adjusted to balance computing time and accuracy. If the image is too small, the image is magnified to the target size through interpolation to improve computing accuracy. If the image is too large, the image is reduced to the target size through down-sampling to improve computing speed.

At S203, the target image is corrected based on initial distortion coefficients to obtain a first corrected target image.

In some embodiments, preset initial distortion coefficients are acquired. In some embodiments, camera model information is detected and distortion coefficients corresponding to the camera model information is searched. The located distortion coefficients are configured as the initial distortion coefficients.

That is, a user may directly enter the initial distortion coefficients according to an actual condition of the camera in order to shorten the computing time of the distortion coefficients. The initial distortion coefficients can also be automatically configured based on a model of the camera. Usually, distortion coefficients of cameras or lenses of the same model are about the same and are usually only slightly different. Thus, after the model of the camera or the lens is detected, common distortion coefficients of the model can be used as the initial distortion coefficients.

In some embodiments, in the process of correcting the image using the initial distortion coefficients, it is feasible to merely correct the border line in the target image to reduce the correction time, thereby shortening the entire computing time for the distortion coefficients.

At S204, a straight-line fitting is performed on a border line included in the first corrected target image to calculate a first distortion metric value and correction distortion coefficients. The border line in the first corrected target image is also referred to as a "first border line." Simple polynomial fitting may be employed for the straight-line fitting. Exemplary methods for the straight-line fitting and calculating the distortion metric value and the correction distortion coefficients are described in more detail below.

At S205, the target image is corrected based on the correction distortion coefficients to obtain a second corrected target image, and a straight-line fitting is performed on a border line included in the second corrected target image to calculate a second distortion metric value. The border line in the second corrected target image is also referred to as a "second border line." In some embodiments, in the process of correcting the target image using the correction distortion coefficients, it is feasible to merely correct a border line in the target image to reduce the correction time, thereby shortening the entire computing time for the distortion coefficients.

At S206, whether a preset correction condition is satisfied is detected. This can include, for example, whether a relative variation amount between the first distortion metric value and the second distortion metric value is smaller than a preset variation threshold. If the relative variation amount is smaller than the preset variation threshold, the correction condition is satisfied. Otherwise, the correction condition is not satisfied. In some embodiments, the relative variation amount can be calculated using: $(E_{O1}-E_{O2})/E_{O2}$. If a calculated result is smaller than the preset threshold, the correction condition is satisfied. If the calculated result is not smaller than the preset threshold, the correction condition is not satisfied.

At S207, if the correction condition is not satisfied, the correction distortion coefficients are configured as the initial distortion coefficients, and S203 to S206 are repeated until the preset correction condition is satisfied. That is, if the relative variation amount is not smaller than the preset variation threshold, a relationship between the first distortion metric value and the second distortion metric value does not satisfy the preset correction condition. This indicates that the correction to the target image using the correction distortion coefficients still does not meet the requirement for distortion correction, and the distortion of the target image is still relatively large. The target image is again corrected based on the correction distortion coefficients, and a new distortion metric value is calculated to determine whether the target image meets the requirement.

At S208, if the preset correction condition is satisfied, image correction is performed based on the correction distortion coefficients.

That is, if the relative variation amount is smaller than the preset threshold and the correction condition is satisfied, or a result obtained after the above processes are repeated is smaller than the preset threshold and the correction condition is satisfied, the relationship between the first distortion metric value and the second distortion metric value satisfies the preset correction condition. This indicates that correction to the target image with the correction distortion coefficients has met the requirement for distortion correction, and the correction distortion coefficients can be outputted for performing subsequent corrections on other target image and other related processing.

Figure 3:
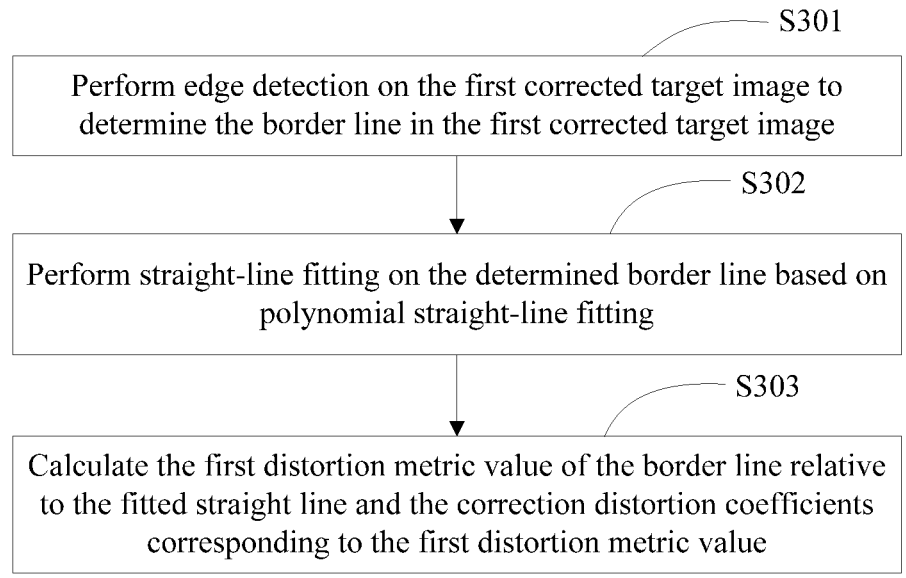
FIG. 3 is a schematic flow chart of processing an image to obtain distortion coefficients according to an embodiment of the present disclosure.

FIG. 3 is a schematic flow chart of processing an image to obtain distortion coefficients according to an embodiment of the present disclosure. The method shown in FIG. 3 corresponds to S204 in FIG. 2. As shown in FIG. 3, at S301, edge detection is performed on the first corrected target image to determine the border line in the first corrected target image. In some embodiments, a detection method having a sub-pixel accuracy may be employed for the edge detection, and can depend on software and hardware resource conditions. For example, in the case that the computing resources are limited, a general integer-pixel edge detection method can be used to detect the border line.

At S302, straight-line fitting is performed on the determined border line based on polynomial straight-line fitting. In some embodiments, simple polynomial fitting may be employed for the straight-line fitting. For example, for n points $(x_j, y_j)$ (j=1, 2, 3, ... n) on a straight line i, $l_i=(a_i,b_i,c_i)$ can be used to represent the straight line i corresponding to these points, where $x_j$, $y_j$, $a_i$, and $c_i$ satisfy the following equation:

$$a_i x_j + b_i y_j + c_i = 0.$$

Different methods can be employed to estimate $a_i$, $b_i$, and $c_i$. For example, they can be calculated as follows:

$$a_i = \sin\theta, \ b_i = \cos\theta, \text{ and } c_i = -\bar{x}\sin\theta - \bar{y}\cos\theta,$$

where:

$$\bar{x} = \frac{1}{n}\Sigma_{j=1}^n x_j, \ \bar{y} = \frac{1}{n}\Sigma_{j=1}^n y_j, \text{ and } \tan 2\theta = -\frac{2V_{xy}}{V_{xx} - V_{yy}}, \text{ where:}$$

$$V_{xx} = \frac{1}{n}\Sigma_{j=1}^n (x_j - \bar{x}), \ V_{xy} = \frac{1}{n}\Sigma_{j=1}^n (x_j - \bar{x})(y_j - \bar{y}),$$

$$\text{and } V_{yy} = \frac{1}{n}\Sigma_{j=1}^n (y_j - \bar{y}).$$

As such, $a_i$, $b_i$, and $c_i$ can be estimated using the above equations.

Another method of estimating $a_i$, $b_i$, and $c_i$ is described below. Assume matrix X is set as a matrix formed by homogenous expressions of the above-mentioned set of n points, i.e., $$X = \begin{bmatrix} x_1 & y_1 & 1 \\ x_2 & y_2 & 1 \\ \cdots & \cdots & \cdots \\ x_n & y_n & 1 \end{bmatrix}.$$

In an ideal scenario, all points $(x_j, y_j)$ are on a same line represented by l, i.e., $$Xl = 0.$$

However, since the points are not ideal, Xl may only be approximately equal to 0. That is, an optimal solution of l can be used as the straight line i corresponding to the points $(x_j, y_j)$. The optimal solution of l satisfies $$\min_l \|Xl\|^2.$$

Various methods can be used to solve this optimization problem. For example, the expression of l can be obtained by solving the following optimization equation:

$$\min_l \|Xl\|^2,$$
$$\text{s.t. } \|l\| = 1.$$

The solution of this equation is a right singular vector corresponding to the smallest singular value of X Suppose that the singular value of X is decomposed as $X = U\Sigma V^T$, then $l = V_3$, where $V_3$ is the third column of V, i.e., the right singular vector corresponding to the smallest singular value. In order to facilitate calculation of a distance from a point to the straight line, after the straight line coefficients are obtained, the coefficients can be multiplied by a scaling factor such that $a_i^2 + b_i^2 = 1$.

In addition, in order to minimize the impact of outliers on the straight-line fitting, fitting points can be selected by using RANSAC (RANdom SAmple Consensus).

At S303, the first distortion metric value of the border line relative to the straight line corresponding to the above-described straight-line fitting and the correction distortion coefficients corresponding to the first distortion metric value are calculated. The straight line corresponding to the straight-line fitting is also referred to as a "fitted straight line." In some embodiments, a straight line segment in the border line can be determined and distances from corresponding points on the straight line segment to the fitted straight line can be calculated. The first distortion metric value can be obtained according to the calculated distances. The correction distortion coefficients can be obtained by non-linearly optimizing the first distortion metric value.

In some embodiments, multiple fitted straight lines can be obtained by the straight-line fitting. Adjacent straight lines having close coefficients can be connected to form one straight line, and the first distortion metric value can be calculated for all of the fitted straight lines, which can be the sum of squares of distances from the points to the lines:

$$E_{01} = \Sigma_i \Sigma_{j \in l_i} (a_i x_j + b_i y_j + c_i)^2,$$

where $a_i$, $b_i$, and $c_i$ are coefficients of the i-th straight line among the multiple straight lines. The smaller $E_{01}$ is, the smaller the distortion is. The greater $E_{01}$ is, the greater the distortion is.

Moreover, it can be seen from the above equation that the distortion metric is a function of $x_j$ and $y_j$. In the distortion equation, $x_j$ and $y_j$ are equations for the distortion coefficients $k = (k_1, k_2)$. Therefore, the distortion metric is a function of the distortion coefficients. A set of $k_1$, $k_2$) values can be found by non-linearly optimizing the function corresponding to the distortion metric that minimizes the distortion metric value, and the set $k = k_1, k_2$) are the correction distortion coefficients.

Figure 4:
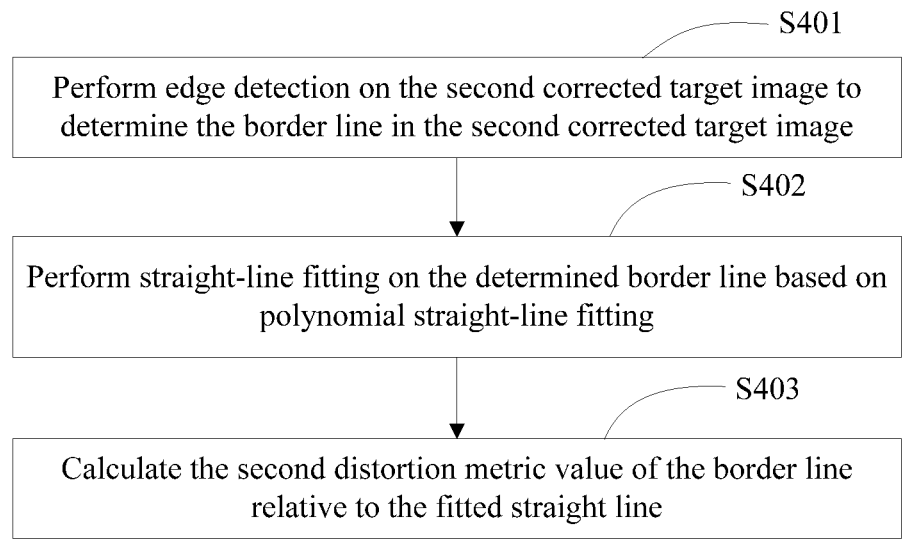
FIG. 4 is a schematic flow chart of processing a corrected image to obtain distortion coefficients according to an embodiment of the present disclosure.

FIG. 4 is a schematic flow chart showing a method of processing a corrected image to obtain distortion coefficients according to an embodiment of the present disclosure. The process shown in FIG. 4 corresponds to S205 in FIG. 2. As shown in FIG. 4, at S401, edge detection is performed on the second corrected target image to determine the border line in the second corrected target image.

At S402, straight-line fitting is performed on the determined border line based on polynomial straight-line fitting.

At S403, the second distortion metric value of the border line relative to a straight line corresponding to the straight-line fitting is calculated. In some embodiments, calculating the second distortion metric value can include removing outliers, determining a straight line segment in the border line, calculating distances from corresponding points on the straight line segment to the straight line corresponding to the straight-line fitting, and obtaining the second distortion metric value according to the calculated distances.

Reference can be made to the description of the corresponding embodiment of FIG. 3 for the processes of the edge detection, the straight-line fitting, and the calculation of the second distortion metric value.

According to the embodiments of the present disclosure, distortion coefficients of an image can be determined based on both straight-line fitting and a distortion metric value. This optimizes a distortion coefficient calculation and can obtain more accurate distortion coefficients automatically and intelligently. The methods consistent with embodiments of the disclosure do not require an additional calibration board, and have a low cost and are easy for users to use.

An image processing device and a video camera according to the embodiments of the present disclosure are described below in detail.

Figure 5:
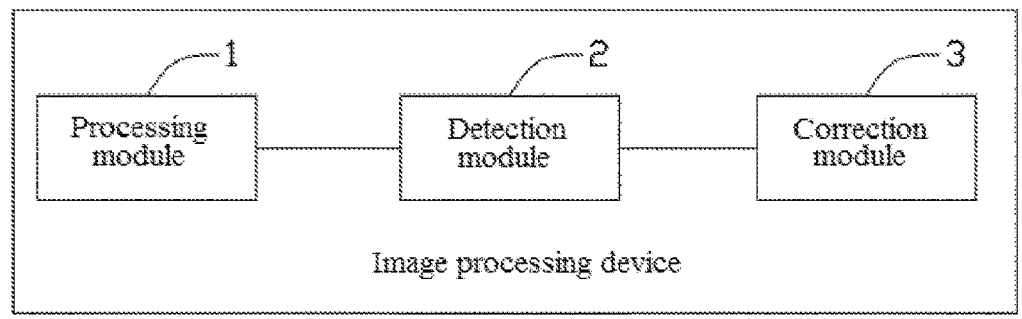
FIG. 5 is a schematic structural diagram of one image processing device according to an embodiment of the present disclosure.

FIG. 5 is a schematic structural diagram of an image processing device according to an embodiment of the present disclosure. The device according to the embodiment of the present disclosure can be configured in various kinds of video cameras. As shown in FIG. 5, the image processing device includes a processing module 1, a detection module 2, and a correction module 3.

The processing module 1 is configured to correct a target image based on initial distortion coefficients to obtain a first corrected target image and to perform straight-line fitting on a border line included in the corrected target image to calculate a first distortion metric value and correction distortion coefficients. The processing module 1 is further configured to correct the target image according to the correction distortion coefficients to obtain a second corrected target image and to perform straight-line fitting on a border line included in the second corrected target image to calculate a second distortion metric value.

The detection module 2 is configured to detect whether a preset correction condition is satisfied. If the preset correction condition is not satisfied, the detection module 2 configures the correction distortion coefficient as the initial distortion coefficient, and forwards the new initial distortion coefficient to the processing module 1 such that the processing module 1 can repeat the correction and straight-line fitting processes based on the new initial distortion coefficient.

The correction module 3 is configured to, when a detection result of the detection module 2 is that the preset correction condition is satisfied, perform image correction based on the correction distortion coefficients.

The initial distortion coefficients used in the image correction performed for the first time by the processing module 1 may be pre-configured. In some embodiments, the initial distortion coefficients can be configured according to a model of a camera lens.

The processing module 1 may determine the border line from the target image by way of edge detection. In the target image, the border line may be a straight-line edge of a building, and distortion of the target image can be corrected through the border line that should be a straight line.

The edge detection used by the processing module 1 may be based on positions of pixel points and amplitude variations of pixel values of the pixel points. In some embodiments, the edge detection can include a detection method having a sub-pixel accuracy.

Simple polynomial straight-line fitting may be employed for the straight-line fitting on the border lines by the processing module 1. A series of discrete pixel points that are supposed to be on a straight line, e.g., the border line, may scatter around a straight line in the image due to distortion. These discrete pixel points can be fitted into a straight line. The fitted straight line is used to reflect a basic trend of these discrete pixel points.

The processing module 1 can obtain the first distortion metric value according to distances from the discrete pixel points to the fitted straight line. After the first distortion metric value is obtained, through a non-linear optimization on a function corresponding to the first distortion metric value, a set of distortion coefficients that minimizes the first distortion metric value can be determined. The determined distortion coefficients are thus the correction distortion coefficients.

In order to save computing time and computing resources, when the processing module 1 corrects the target image according to the first distortion coefficient, the processing module 1 may only correct the border line in the target image. When straight-line fitting is carried out, outliers can be removed to calculate the second distortion metric value more quickly.

The detection module 2 may determine whether the first distortion metric value and the second distortion metric value satisfy the preset correction condition by judging whether a relative variation amount between the first distortion metric value and the second distortion metric value is smaller than a preset variation threshold. In some embodiments, an equation for calculating the relative variation amount may be: $(E_{01}-E_{02})/E_{02}$, where $E_{01}$ denotes the first distortion metric value and $E_{02}$ denotes the second distortion metric value. If a calculation result is smaller than the preset variation threshold, the correction condition is satisfied. On the other hand, if the calculation result is not smaller than the preset variation threshold, the correction condition is not satisfied.

If the detection module 2 detects that the preset correction condition is not satisfied, e.g., when the relationship between the first distortion metric value and the second distortion metric value is not smaller than the preset variation threshold, the correction to the target image is not sufficient enough to correct the distortion, and the distortion of the target image is still relatively large. In this scenario, the detection module 2 can notify the processing module 1 to correct the target image once again based on the correction distortion coefficients and to calculate a new distortion metric value to determine whether the corrected target image meets the requirement.

If the correction condition is satisfied, e.g., if the above relative variation amount is smaller than the preset threshold or if the second distortion metric value is smaller than a preset metric threshold, the detection module 2 determines that the preset correction condition is satisfied, which indicates that the correction to the target image with the correction distortion coefficients has met the requirement for distortion correction. The correction module 3 uses the correction distortion coefficients for subsequent image correction and other related processing.

According to the embodiment of the present disclosure, distortion coefficients of an image can be determined based on straight-line fitting and a distortion metric value. This optimizes a distortion coefficient calculation and can obtain more accurate distortion coefficients automatically and intelligently. Further, additional calibration board is not required, which reduces cost and is easy for users to use.

Figure 6:
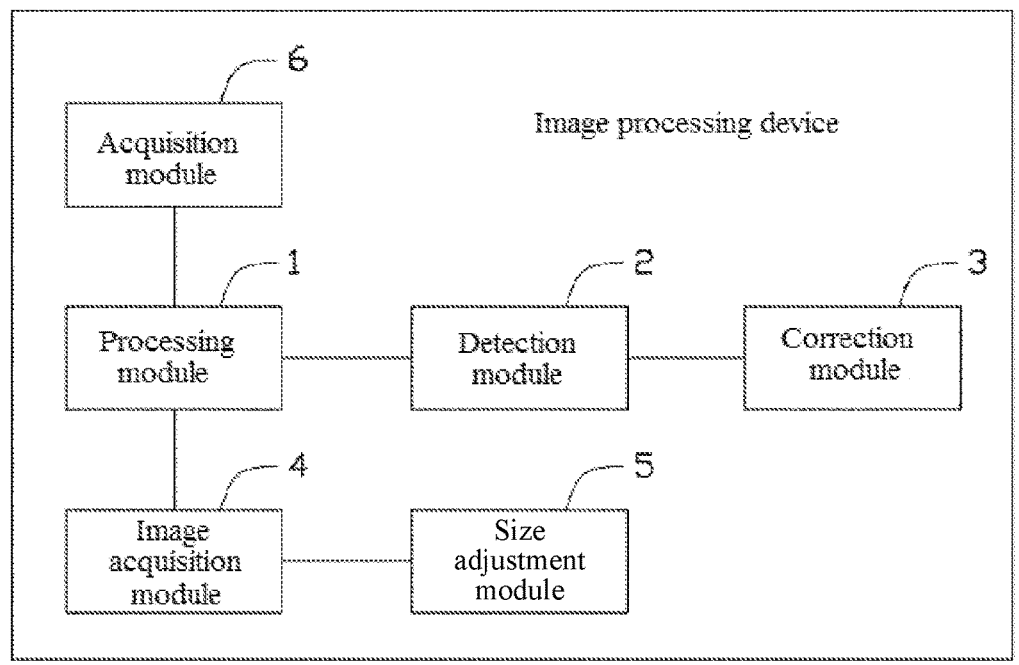
FIG. 6 is a schematic structural diagram of another image processing device according to an embodiment of the present disclosure.

FIG. 6 is a schematic structural diagram of another image processing device according to an embodiment of the present disclosure. The device according to the embodiment of the present disclosure can be configured in various kinds of video cameras. As shown in FIG. 6, the image processing device includes the processing module 1, the detection module 2, the correction module 3, an image acquisition module 4, and a size adjustment module 5.

The image acquisition module 4 is configured to capture an image of an object that includes straight line features. The size adjustment module 5 is configured to adjust the size of the captured image to obtain a target image.

In some embodiments, the size adjustment module 5 is configured to, if the size of the captured image is smaller than a preset size threshold, magnify the captured image to a target size through interpolation; and, if the size of the captured image is greater than the preset size threshold, scale down the captured image to the target size through down-sampling.

The image acquisition module 4 may analyze multiple pictures captured and use an image including an object with straight line features, such as a building, a playground, or a motorway, as a target image for subsequent distortion analysis. In the embodiment of the present disclosure, the size adjustment module 5 can process multiple images simultaneously or subsequently, and each image can be processed in the same manner.

Because the distortion coefficients are irrelevant to the size of the image, the size adjustment module 5 can adjust the size of the target image in order to balance computing time and accuracy. If the image is too small, the size adjustment module 5 magnifies the image to a target size through interpolation to improve the computing accuracy; and if the image is too large, the size adjustment module 5 reduces the image to the target size through down-sampling to improve the computing speed.

Figure 7:
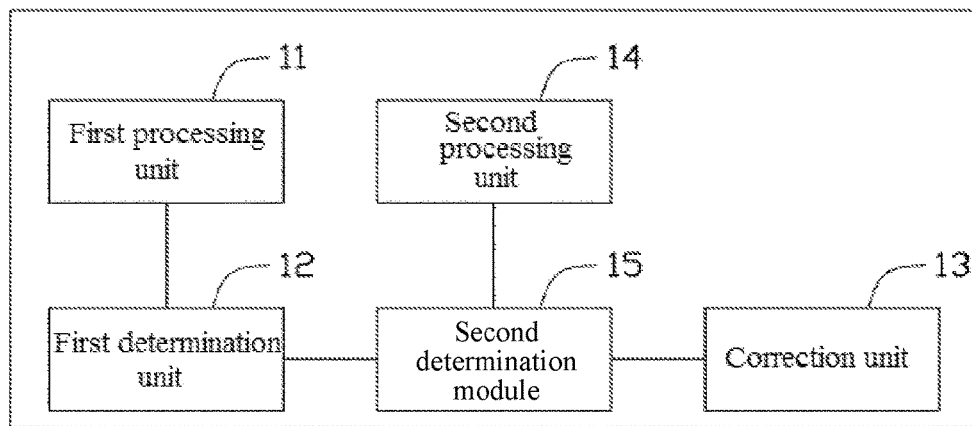
FIG. 7 is a schematic structural diagram of a processing module in FIG. 6.

In some embodiments, as shown in FIG. 7, the processing module 1 includes a first processing unit 11, a first determination unit 12, a correction unit 13, a second processing unit 14, and a second determination unit 15.

The first processing unit 11 configured to perform edge detection on the target image to determine a border line in the target image, and to perform straight-line fitting on the determined border line based on polynomial straight-line fitting to obtain a fitted straight line.

The first determination unit 12 is configured to calculate a first distortion metric value of the border line relative to the fitted straight line and correction distortion coefficients corresponding to the first distortion metric value.

In some embodiments, the first determination unit 12 is configured to determine a straight line segment in the border line, calculate distances from corresponding points on the straight line segment to the fitted straight line, obtain the first distortion metric value according to the calculated distances, and non-linearly optimize the first distortion metric value to obtain the correction distortion coefficients.

The correction unit 13 is configured to correct the border line in the target image according to the initial distortion coefficients or the correction distortion coefficients to complete correction of the target image.

The second processing unit 14 is configured to perform edge detection on the corrected target image to determine a border line in the corrected target image, and perform straight-line fitting on the determined border line based on polynomial straight-line fitting to obtain a fitted straight line.

The second determination unit 15 is configured to calculate a second distortion metric value of the border line corresponding to the fitted straight line. In some embodiments, the second determination unit 15 is further configured to remove outliers and determine a straight line segment in the border line, and calculate distances from corresponding points on the straight line segments to the fitted straight line and obtain the second distortion metric value based on the calculated distances.

Figure 8:
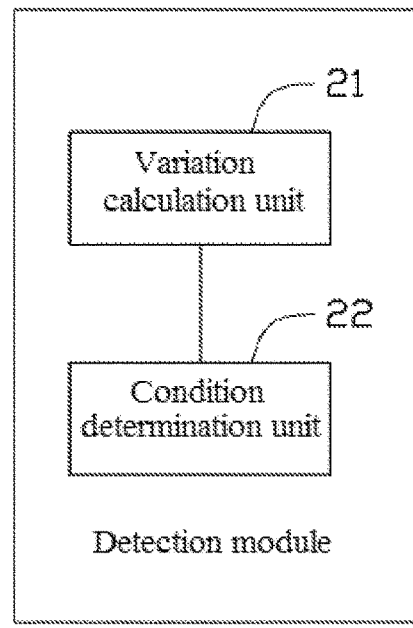
FIG. 8 is a schematic structural diagram of a detection module in FIG. 6.

In some embodiments, as shown in FIG. 8, the detection module 2 includes a variation calculation unit 21 and a condition determination unit 22. The variation calculation unit 21 is configured to calculate a relative variation amount between the first distortion metric value and the second distortion metric value. The condition determination unit 22 is configured to, if the relative variation amount calculated is smaller than a preset variation threshold, determine that the correction condition is satisfied, or otherwise, determine that the correction condition is not satisfied.

Referring again to FIG. 6, in some embodiments, the device according to the embodiment of the present disclosure further includes an acquisition module 6 configured to acquire preset initial distortion coefficients, or detect camera model information, search for distortion coefficients corresponding to the camera model information, and configure the located distortion coefficients as the initial distortion coefficients.

Functions of various modules and units in the embodiments described above in connection with FIGS. 5-8 are similar to the methods in the embodiments described above in connection with FIGS. 1-4, and detailed description thereof is omitted.

According to embodiments of the present disclosure, distortion coefficients of an image can be determined based on straight-line fitting and a distortion metric value. This optimizes a distortion coefficient calculation and can obtain more accurate distortion coefficients automatically and intelligently. Therefore, additional calibration board is not required, which reduces cost and is easy for users to use.

Figure 9:
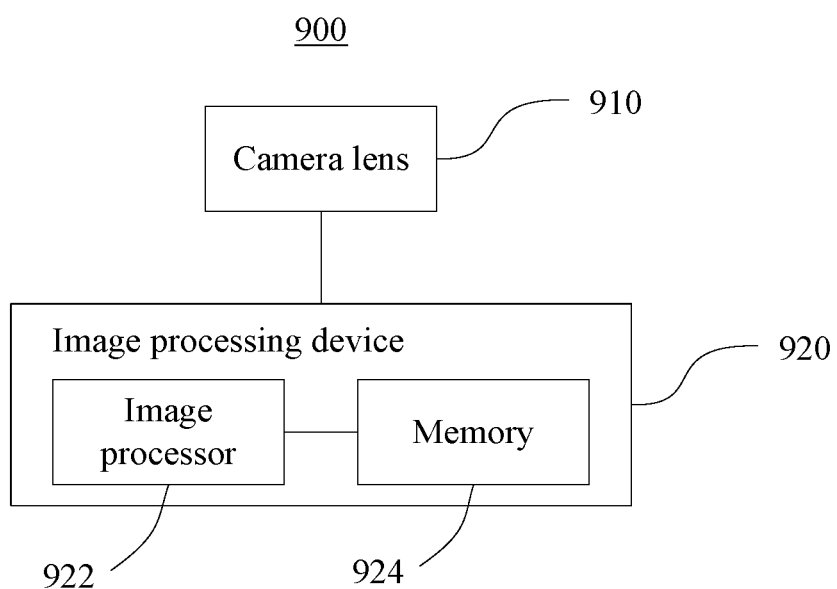
FIG. 9 is a schematic structural diagram of a video camera according to an embodiment of the disclosure.

FIG. 9 is a schematic structural diagram of a video camera 900 consistent with embodiments of the disclosure. The video camera 900 includes a camera lens 910 and an image processing device 920. The image processing device 920 includes an image processor 922 and a memory 924. The memory 924 stores an image processing program containing instructions consistent with embodiments of the disclosure. When the image processing program is executed by the image processor 922, it causes the image processor 922 to execute a method consistent with embodiments of the disclosure, such as one of the exemplary methods described above.

In some embodiments, the image processor 922 is configured to correct a target image according to initial distortion coefficients to obtain a first corrected target image and perform straight-line fitting on a border line included in the first corrected target image to calculate a first distortion metric value and correction distortion coefficients. The image processor 922 is further configured to correct the target image according to the correction distortion coefficients to obtain a second corrected target image and perform straight-line fitting on a border line included in the second corrected target image to calculate a second distortion metric value. The image processor 922 can detect whether a preset correction condition is satisfied. If the preset correction condition is not satisfied, the image processor 922 can configure the correction distortion coefficients as the initial distortion coefficients, and perform processing again until the preset correction condition is satisfied. If the preset correction condition is satisfied, the processor 922 can perform image correction according to the correction distortion coefficients.

In some embodiments, the image processor 922 is configured to capture an image of an object including straight line features through the camera lens 910, and adjust the size of the captured image to obtain the target image. In some embodiments, the image processor 922 is configured to, if the size of the captured image is smaller than a preset size threshold, magnify the captured image to a target size through interpolation, and if the size of the captured image is greater than the preset size threshold, scale down the captured image to the target size through down-sampling.

In some embodiments, the image processor 922 is configured to perform edge detection on the target image to determine a border line in the target image, perform straight-line fitting on the determined border line based on polynomial straight-line fitting to obtain a fitted straight line, and calculate the first distortion metric value of the border line corresponding to the fitted straight line and the correction distortion coefficients corresponding to the first distortion metric value.

In some embodiments, the image processor 922 determines a straight line segment in the border line, calculates distance from corresponding points on the straight line segment to the fitted straight line and obtains the first distortion metric value according to the calculated distances, and non-linearly optimizes the first distortion metric value to obtain the correction distortion coefficients.

In some embodiments, the image processor 922 is configured to correct the border line in the target image according to the initial distortion coefficients or the correction distortion coefficients to complete correction of the target image.

In some embodiments, the image processor 922 is configured to perform edge detection on the second corrected target image to determine a border line in the second corrected target image, perform straight-line fitting on the determined border line based on polynomial straight-line fitting to obtain a fitted straight line, and calculate the second distortion metric value of the border line relative to the fitted straight line.

In some embodiments, the image processor 922 is configured to remove outliers and determine a straight line segment in the border line, and calculate distances from corresponding points on the straight line segment to the fitted straight line and obtain the second distortion metric value according to the calculated distances.

In some embodiments, the image processor 922 is configured to calculate a relative variation amount between the first distortion metric value and the second distortion metric value. If the relative variation amount calculated is smaller than a preset variation threshold, the correction condition is satisfied. Otherwise, the correction condition is not satisfied.

In some embodiments, the image processor 922 is further configured to acquire preset initial distortion coefficients, or detect camera model information and search for distortion coefficients corresponding to the camera model information to configure the located distortion coefficients as the initial distortion coefficients.

According to the embodiment of the present disclosure, a distortion coefficient of an image can be determined comprehensively based on straight-line fitting and a distortion metric value. This optimizes a distortion coefficient calculation manner and can obtain more accurate distortion coefficients automatically and intelligently. The embodiment also does not require an additional calibration board, and has a low cost and is easy for users to use.

In the several embodiments provided in the present disclosure, it should be understood that the related devices and methods disclosed may be implemented in another manner. For example, the device embodiments described above are merely illustrative. For example, division of the module or unit is merely division of a logical function, and division in another manner may exist in actual implementation. For example, a plurality of units or assemblies may be combined or integrated to another system, or some features may be omitted or not performed. In addition, the mutual coupling or direct coupling or communication connections displayed or discussed may be implemented by using some interfaces, and the indirect coupling or communication connections between the devices or units may be electrical, mechanical or in another form.

The units described as separate components may be or may not be physically separate, and components displayed as units may be or may not be physical units, may be located in one position, or may be distributed on a plurality of network units. Some or all of the units may be selected according to actual needs to achieve the objective of the solution of the embodiment.

In addition, functional units in the embodiments of the present disclosure may be integrated into one processing unit, or each of the units may exist alone physically, or two or more units may be integrated into one unit. The aforementioned integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. The computer software product is stored in a storage medium, and includes several instructions used for causing a computer processor to perform all or a part of a method consistent with embodiments of the present disclosure, such as one of the exemplary methods described above. The foregoing storage medium includes any medium that can store program codes, such as a USB flash drive, a portable hard disk, a Read-Only Memory (ROM), a Random Access Memory (RAM), a magnetic disk, or an optical disc.

In some embodiments (for example, when only the distortion in one dimension is of concern, or when the distortion in one dimension is negligible such that only the distortion in the other dimension needs to be considered), instead of calculating the two distortion coefficients $k_1$ and $k_2$ as discussed above, only one distortion coefficient $k_1$ or $k_2$ may need to be calculated. The methods and apparatuses for calculating the one distortion coefficient are similar to those described above for calculating both distortion coefficients, and thus detailed description thereof is omitted.

The above descriptions merely relate to embodiments of the present disclosure, but are not intended to limit the scope of the present disclosure. Any equivalent structure or equivalent process variation made by using contents of the specification and the drawings of the present disclosure, or directly or indirectly applied to other related technical fields, should be likewise included in the scope of the present disclosure.

What is claimed is:

1. An image processing method, comprising:
    correcting a target image based on an initial distortion coefficient to obtain a first corrected target image;
    performing straight-line fitting on a first border line in the first corrected target image to calculate a first distortion metric value and a correction distortion coefficient;
    correcting the target image based on the correction distortion coefficient to obtain a second corrected target image;
    performing straight-line fitting on a second border line in the second corrected target image to calculate a second distortion metric value;
    detecting whether a preset correction condition is satisfied by determining whether the second distortion metric value is smaller than a preset metric threshold;
    configuring, if the preset correction condition is not satisfied, the correction distortion coefficient as the initial distortion coefficient; and
    applying, if the preset correction condition is satisfied, the correction distortion coefficient to subsequent image correction to obtain better corrected images.

2. The method according to claim 1, further comprising, before correcting the target image:
    capturing an image of an object including straight line features; and
    adjusting a size of the captured image to obtain the target image.

3. The method according to claim 2, wherein adjusting the size of the captured image includes:
    magnifying, if the size of the captured image is smaller than a preset size threshold, the captured image to a target size through interpolation; or
    scaling down, if the size of the captured image is greater than the preset size threshold, the captured image to the target size through down-sampling.

4. The method according to claim 1, wherein performing straight-line fitting on the first border line to calculate the first distortion metric value and the correction distortion coefficient includes:
    performing edge detection on the first corrected target image to determine the first border line in the first corrected target image;
    performing straight-line fitting on the first border line based on polynomial straight-line fitting to obtain a fitted straight line; and
    calculating the first distortion metric value of the first border line relative to the fitted straight line and the correction distortion coefficient corresponding to the first distortion metric value.

5. The method according to claim 4, wherein calculating the first distortion metric value and the correction distortion coefficient includes:
    determining a straight line segment in the first border line;
    calculating distances from corresponding points on the straight line segment to the fitted straight line;
    obtaining the first distortion metric value according to the distances; and
    performing non-linear optimization on the first distortion metric value to obtain the correction distortion coefficient.

6. The method according to claim 1, wherein:
    correcting the target image according to the initial distortion coefficient includes correcting a target border line in the target image based on the initial distortion coefficient, and
    correcting the target image based on the correction distortion coefficient includes correcting the target border line in the target image based on the correction distortion coefficient.

7. The method according to claim 1, wherein performing straight-line fitting on the second border line to calculate the second distortion metric value includes:
    performing edge detection on the second corrected target image to determine the second border line in the second corrected target image;
    performing straight-line fitting on the second border line based on polynomial straight-line fitting to obtain a fitted straight line; and
    calculating the second distortion metric value of the second border line relative to the fitted straight line.

8. The method according to claim 7, wherein calculating the second distortion metric value includes:
    removing outliers;
    determining a straight line segment in the second border line;
    calculating distances from corresponding points on the straight line segment to the fitted straight line; and
    obtaining the second distortion metric value according to the distances.

9. A camera, comprising:
    a camera lens; and
    an image processor configured to:
        correct a target image based on an initial distortion coefficient to obtain a first corrected target image;
        perform straight-line fitting on a first border line in the first corrected target image to calculate a first distortion metric value and a correction distortion coefficient;
        correct the target image based on the correction distortion coefficient to obtain a second corrected target image;
        perform straight-line fitting on a second border line in the second corrected target image to calculate a second distortion metric value;
        detect whether a preset correction condition is satisfied by determining whether the second distortion metric value is smaller than a preset metric threshold;
        configure, if the preset correction condition is not satisfied, the correction distortion coefficient as the initial distortion coefficient; and
        apply, if the preset correction condition is satisfied, the correction distortion coefficient to subsequent image correction to obtain better corrected images.

10. The camera according to claim 9, wherein the image processor is further configured to:
    capture an image of an object including straight line features through the camera lens; and
    adjust a size of the captured image to obtain the target image.

11. The camera according to claim 10, wherein the image processor is further configured to:
    magnify, if the size of the captured image is smaller than a preset size threshold, the captured image to a target size through interpolation; or
    scale down, if the size of the captured image is greater than the preset size threshold, the captured image to the target size through down-sampling.

12. The camera according to claim 9, wherein the image processor is further configured to:
    perform edge detection on the first corrected target image to determine the first border line in the first corrected target image;
    perform straight-line fitting on the first border line based on polynomial straight-line fitting to obtain a fitted straight line; and
    calculate the first distortion metric value of the first border line relative to the fitted straight line and the correction distortion coefficient corresponding to the first distortion metric value.

13. The camera according to claim 12, wherein the image processor is further configured to:
    determine a straight line segment in the first border line;
    calculate distances from corresponding points on the straight line segment to the fitted straight line;
    obtain the first distortion metric value according to the distances; and
    perform non-linear optimization on the first distortion metric value to obtain the correction distortion coefficient.

14. The camera according to claim 9, wherein the image processor is further configured to:

correct the target image according to the initial distortion coefficient by correcting a target border line in the target image based on the initial distortion coefficient, and correct the target image based on the correction distortion coefficient by correcting the target border line in the target image based on the correction distortion coefficient.

15. The camera according to claim 9, wherein the image processor is further configured to:
   perform edge detection on the second corrected target image to determine the second border line in the second corrected target image;
   perform straight-line fitting on the second border line based on polynomial straight-line fitting to obtain a fitted straight line; and
   calculate the second distortion metric value of the second border line relative to the fitted straight line.

16. The camera according to claim 15, wherein the image processor is further configured to:
   remove outliers;
   determine a straight line segment in the second border line;
   calculate distances from corresponding points on the straight line segment to the fitted straight line; and
   obtain the second distortion metric value according to the distances.

* * * * *